(12) United States Patent
Turk

(10) Patent No.: US 8,854,988 B2
(45) Date of Patent: *Oct. 7, 2014

(54) GLOBAL FLOW TRACKING SYSTEM

(75) Inventor: Doughan Turk, Mississauga (CA)

(73) Assignee: Juniper Networks, Inc., Sunnyvale, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 13/190,526

(22) Filed: Jul. 26, 2011

(65) Prior Publication Data

US 2011/0280150 A1 Nov. 17, 2011

Related U.S. Application Data

(63) Continuation of application No. 12/200,137, filed on Aug. 28, 2008, now Pat. No. 8,009,559.

(51) Int. Cl.
*H04L 1/00* (2006.01)
*H04L 29/06* (2006.01)

(52) U.S. Cl.
CPC ......... *H04L 63/1416* (2013.01); *H04L 63/0218* (2013.01)
USPC ............................ 370/248; 370/249; 370/252

(58) Field of Classification Search
USPC .................................. 370/230, 248, 249, 252
See application file for complete search history.

(56) References Cited

U.S. PATENT DOCUMENTS

| | | | |
|---|---|---|---|
| 6,704,874 B1 * | 3/2004 | Porras et al. | 726/22 |
| 6,889,181 B2 * | 5/2005 | Kerr et al. | 703/27 |
| 6,944,673 B2 | 9/2005 | Malan et al. | |
| 6,981,158 B1 * | 12/2005 | Sanchez et al. | 726/2 |
| 7,062,782 B1 | 6/2006 | Stone et al. | |
| 7,120,931 B1 * | 10/2006 | Cheriton | 726/13 |
| 7,185,368 B2 * | 2/2007 | Copeland, III | 726/25 |
| 7,200,105 B1 * | 4/2007 | Milliken et al. | 370/216 |
| 7,254,114 B1 * | 8/2007 | Turner et al. | 370/244 |
| 7,254,713 B2 | 8/2007 | D'Souza | |
| 7,266,754 B2 | 9/2007 | Shah et al. | |
| 7,302,705 B1 * | 11/2007 | Boivie | 726/22 |
| 7,359,930 B2 | 4/2008 | Jackson et al. | |
| 7,367,054 B2 | 4/2008 | Soppera | |
| 7,392,543 B2 | 6/2008 | Szor | |
| 7,444,417 B2 * | 10/2008 | Jayawardena et al. | 709/229 |
| 7,512,980 B2 | 3/2009 | Copeland et al. | |
| 7,561,569 B2 * | 7/2009 | Thiede | 370/389 |
| 7,580,356 B1 * | 8/2009 | Mishra et al. | 370/230.1 |
| 7,584,298 B2 | 9/2009 | Klinker et al. | |
| 7,620,691 B1 | 11/2009 | Goldman et al. | |
| 7,689,455 B2 * | 3/2010 | Fligler et al. | 705/7.38 |

(Continued)

OTHER PUBLICATIONS

Co-pending U.S. Appl. No. 12/200,137, filed Aug. 28, 2008 entitled "Golbal Flow Tracking System" by Doughan Turk, 38 pages.

*Primary Examiner* — Ricky Ngo
*Assistant Examiner* — Dewanda Samuel
(74) *Attorney, Agent, or Firm* — Harrity & Harrity, LLP

(57) ABSTRACT

A device may obtain a flow signature, identify a destination collector to which packets bearing the flow signature are sent, obtain a list of potential source collectors that may have sent the packets bearing the flow signature to the destination collector, and identify a source collector, among the potential source collectors, that sent the packets to the destination collector. In addition, the device may output information related to a path from the source collector the destination collector.

22 Claims, 10 Drawing Sheets

(56) References Cited

U.S. PATENT DOCUMENTS

| | | | |
|---|---|---|---|
| 7,706,273 B2 | 4/2010 | Poletto et al. | |
| 7,751,325 B2* | 7/2010 | Krishnamurthy et al. | 370/233 |
| 8,225,400 B2* | 7/2012 | Pacella et al. | 726/23 |
| 2002/0032871 A1 | 3/2002 | Malan et al. | |
| 2002/0035683 A1 | 3/2002 | Kaashoek et al. | |
| 2002/0141343 A1* | 10/2002 | Bays | 370/235 |
| 2003/0097557 A1* | 5/2003 | Tarquini et al. | 713/153 |
| 2003/0145226 A1 | 7/2003 | Bruton et al. | |
| 2003/0167402 A1 | 9/2003 | Stolfo et al. | |
| 2004/0148520 A1* | 7/2004 | Talpade et al. | 713/201 |
| 2004/0199576 A1* | 10/2004 | Tan | 709/203 |
| 2005/0060582 A1* | 3/2005 | Choi et al. | 713/201 |
| 2005/0132044 A1* | 6/2005 | Guingo et al. | 709/225 |
| 2005/0160289 A1* | 7/2005 | Shay | 713/201 |
| 2006/0085861 A1 | 4/2006 | Belenky et al. | |
| 2006/0184690 A1* | 8/2006 | Milliken | 709/238 |
| 2006/0272018 A1* | 11/2006 | Fouant | 726/23 |
| 2007/0016641 A1 | 1/2007 | Broomhall | |
| 2007/0140128 A1 | 6/2007 | Klinker et al. | |

\* cited by examiner

GLOBAL FLOW TRACKING SYSTEM

RELATED APPLICATION

This application is a continuation of U.S. patent application Ser. No. 12/200,137 filed Aug. 28, 2008, which is incorporated herein by reference.

BACKGROUND

In today's networks, devices, such as switches or routers, are used not only to route and/or switch packets toward their destinations, but also to collect information related to network devices, applications that are hosted on the network devices, and/or the network traffic. In some instances, the devices may collect the information from one or more flows, each of which is a stream of packets that are forwarded from a source to a destination.

SUMMARY

According to one aspect, a method may include obtaining a flow signature; identifying a destination collector to which packets bearing the flow signature are sent, obtaining a list of potential source collectors that may have sent the packets bearing the flow signature to the destination collector, and identifying a source collector, among the potential source collectors, that sent the packets to the destination collector. In addition, the method may include outputting information related to a path from the source collector the destination collector.

According to another aspect, a device may include a flow tracer to receive an alarm triggered by a flow of packets, trace the flow to a destination collector, identify potential source collectors from which the packets may be sent to the destination collector, and identify, in a list of the potential source collectors, verified collectors through which the flow passed. Further, the flow tracer may be configured to determine a path between the list of verified collectors and the destination collector, identify a first collector in the path, and output information related to the path and the first collector.

According to yet another aspect, the device may include means for receiving an alarm, means for obtaining a flow signature from the alarm, means for obtaining a list of source collectors based on the flow signature, means for using a global routing map and the list of source collectors to obtain a new list of potential source collectors, means for sending flow match requests to determine, among the new potential source collectors, verified collectors with flow records bearing the flow signature, means for receiving replies that identify the verified collectors, and means for identifying new source collectors based on identities of the verified collectors and the global routing map.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF PREFERRED EMBODIMENTS

The following detailed description refers to the accompanying drawings. The same reference numbers in different drawings may identify the same or similar elements.

As used herein, the term "packet" may refer to a packet, a datagram, or a cell; a fragment of a packet, a datagram or a cell; or other types or arrangements of data. The term "source," as used herein, may refer to a node (e.g., network node, a network socket, etc.) from which packets are transmitted. The term "destination," used herein, may refer to a node to which the packets are transmitted. A source or a destination may be a logical source or destination that is associated with one or more identifiers, such as an Internet Protocol (IP) address, a port number, etc. The term "flow," as used herein, may refer to a stream of packets from a source to a destination.

As described below, a global flow tracking system may allow multiple networks to share information related to a flow (e.g., a flow whose packets perform a denial-of-service (DoS) attack). In particular, if a user (e.g., a security administrator, a device, a program, etc.) is investigating the flow and wishes to determine from where the flow originates, the user may send a flow match request (e.g., a request for information related to a flow) to a global flow tracking manager that may relay the flow match request to the networks. When one or more of the networks respond with information about the flow, the global flow tracking manager may track the flow to a device from which the flow originates. In some instances, the system may show the result of tracking on a diagram of networks through which the flow passes to the destination.

Figure 1:
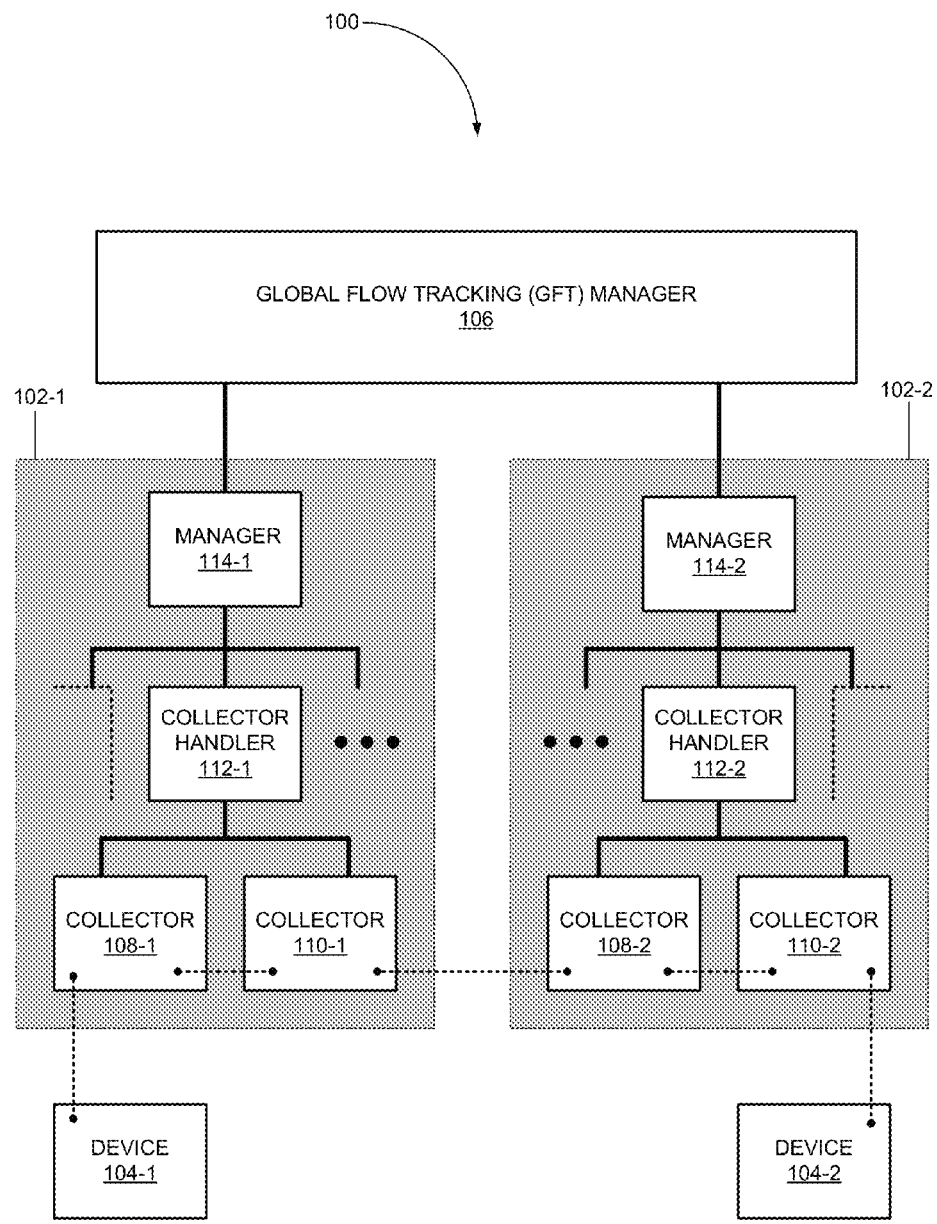
FIG. 1 is a diagram of an exemplary network in which concepts described herein may be implemented.

FIG. 1 is a diagram of a network in which concepts described herein may be implemented. As shown, network 100 may include networks 102-1 and 102-2 (herein collectively referred to as "networks 102" and individually as network 102-x) and devices 104-1 and 104-2 (herein collectively referred to as devices 104 and individually as device 104-x). Depending on the implementation, network 100 may include fewer or additional networks 102 and/or devices 104.

Network 102-x may include an intranet, a local area network (LAN), a wide area network (WAN), a metropolitan area network (MAN), an ad hoc network, or a combination of one or more networks. In some implementations, network 102-x may include an autonomous system, which is a set of devices (e.g., routers) under one administration. The autonomous system may use a border gateway protocol (e.g., interior gateway protocol (IGP) and/or exterior border gateway protocol (EGP) to determine routing paths for packets.

In FIG. 1, although network 102-2 is illustrated as being similar to network 102-1 for purposes of simplicity in discussion, network 102-2 may include additional, fewer, or different components than those of network 102-1. In addition, the devices in network 102-2 may be interconnected differently than the devices in network 102-1.

Device 104-*x* may include a device that communicates with other devices over networks 102 (e.g., a personal computer, a server, a mobile device, etc.).

Global flow tracking (GFT) manager 106 may include one or more devices for accepting a request from a user to track one or more interrelated flows and/or receiving flow match requests. A flow match request may include a flow signature (e.g., one or more parameters that characterize a flow) and a request for information about flows that match the flow signature. In addition, GFT manager 106 may send flow match requests to devices in networks 102.

When GFT manager 106 receives the information from one or more networks 102, GFT manager 106 may perform flow tracking (described below). Once GFT manager 106 obtains the result of flow tracking, GFT manager 106 may store the result in a database or provide the result to the user, for example, in a diagram that illustrates different networks though which the flow passes.

As further shown in FIG. 1, network 102-1 may include collector 108-1, collector 110-1, collector handler 112-1, and manager 114-1. Although not illustrated in FIG. 1 for purposes of simplicity in discussion, network 102-1 may include additional collector handlers and/or collectors.

Collector 108-1 or collector 110-1 may include a device for collecting data about flows. While collector 108-1/110-1 may be implemented as a stand-alone device or as part of another device (e.g., router/switch), in the following discussion, collector 108-1/110-1 will be discussed in terms of a router. In addition to collecting flow data, collector 108-1/110-1 may export (e.g., send) the collected flow data to other devices in network 102-1 (e.g., collector handler 112-1).

Collector handler 112-1 may include a device for managing collectors 108-1 and 110-1. Although FIG. 1 shows collector handler 112-1 as overseeing only two collectors 108-1 and 110-1, collector handler 112-1 may control additional or fewer collectors. In managing a collector, collector handler 112-1 may cause the collector to obtain flow data with a matching flow signature at a scheduled time, receive flow data that is exported by the collector, and store the flow data.

When collector handler 112-1 receives a flow match request from another device (e.g., manager 114-1), collector handler 112-1 may match a flow signature in the request to flow data. If collector handler 112-1 identifies a flow with the flow signature, collector handler 112-1 may generate an alert, notifying other devices or users (e.g., manager 114-1, a network administrator, etc.).

When collector handler 112-1 receives an instruction from a device (e.g., manager 114-1), collector handler 112-1 may cause one or more collectors to collect flow data at a scheduled time. Alternatively, if collector handler 112-1 oversees one or more other collector handlers, collector handler 112-1 may relay the instruction to such collector handlers, each of which, in turn, may propagate the instruction to collectors or yet other collector handlers.

Collector handler 112-1 may receive flow data that is exported by one or more collectors (e.g., collector 108-1), and store the flow data in a database. When collector handler 112-1 receives a flow match request from a device (e.g., manager 114-1), collector handler 112-1 may search the database for records that may match a flow signature specified in the flow request, and may provide the records and/or information related to the records to the device (e.g., geographical information, devices the flows associated with the records may be transiting, real IP addresses of devices, etc.).

In some instances, collector handler 112-1 may generate an alert when collector handler 112-1 detects a flow with a particular flow signature. For example, when collector handler 112-1 receives exported flow data from collector 108-1, collector handler 112-1 may scan the flow data for a flow signature. Upon detecting the flow signature, collector handler 112-1 may send an alert to a device and/or a user (e.g., via an email), indicating in which flow the signature is detected.

Manager 114-1 may include a device for detecting anomalies in collector handler 112-1, performing functionalities of collector handler 112-1, receiving a flow match request from GFT manager 106, relaying the flow match request to collector handlers (e.g., collector handler 112-1), receiving a response to the flow match request from collector handlers, providing the result to GFT manager 106, scheduling a collection time for flow data at a specific collector or collector handler, and/or relaying conditions for triggering alerts to a collector handler (e.g., collector handler 112-1).

As further shown in FIG. 1, network 102-2 may include collector 108-2, collector 110-2, collector handler 112-2, and manager 114-2. Manager 114-2, collector handler 112-2, collector 108-2, and collector 110-2 may include similar components/devices as manager 114-1, collector handler 112-1, collector 108-1, and collector 110-1, and may operate similarly.

Figure 2:
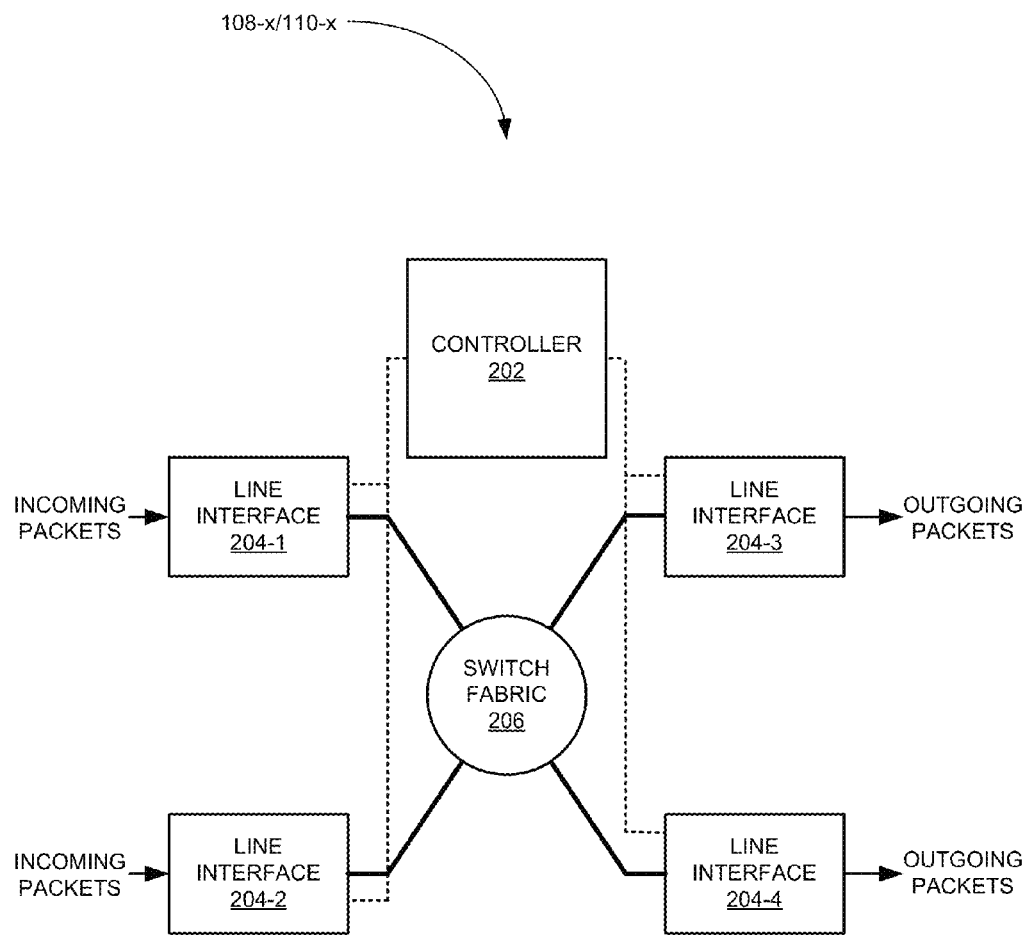
FIG. 2 is a block diagram of an exemplary device of FIG. 1.

FIG. 2 illustrates exemplary components of collector 108-*x*/110-*x* of FIG. 1. As shown, collector 108-*x*/110-*x* may include a controller 202, line interfaces 204-1 through 204-4 (herein collectively referred as line interfaces 204 and individually as line interface 204-*x*), and a switch fabric 206. Depending on the implementation, collector 108-*x*/110-*x* may include fewer, additional, and/or different components than shown in FIG. 2. For example, collector 108-*x*/110-*x* may include additional or fewer line interfaces, additional controllers, and/or modules for rendering specific services (e.g., an intrusion detection service).

Controller 202 may include one or more components for managing routes and/or information that may require centralized processing. For example, controller 202 may manage routes (e.g., may accept or disseminate routes to routers) in accordance with routing/signaling protocols, may receive and process statistics related to packets, and/or may process packet samples from other components of collector 108-*x*/110-*x* (e.g., from line interfaces 204).

Line interface 204-*x* may include one or more components for receiving packets from devices in network 100 and for transmitting the packets to other devices in network 100. In addition, line interface 204-*x* may forward packets, classify packets, redirect packets to other components in collector 108-*x*/110-*x*, manage a table of packet statistics, and/or sample packets.

Figure 3:
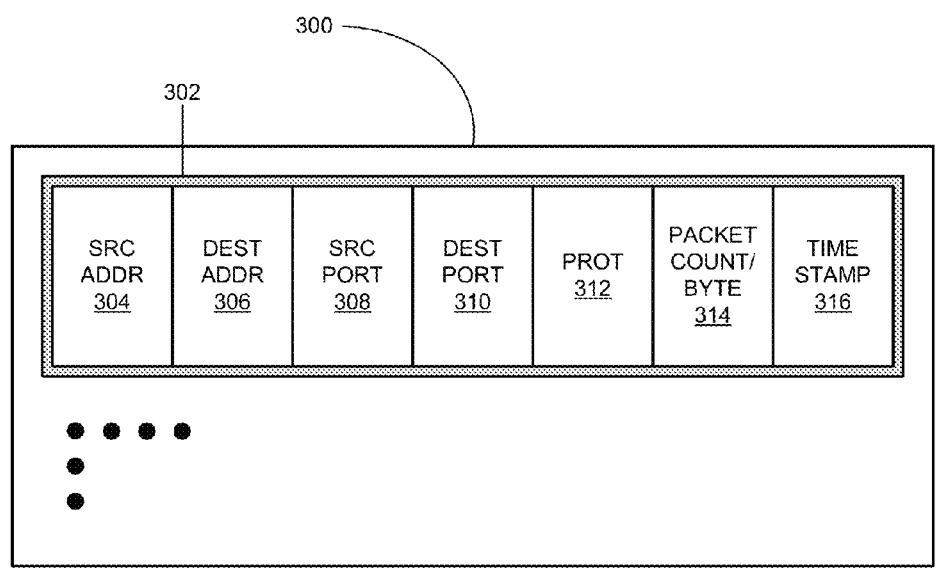
FIG. 3 is a block diagram of an exemplary flow table.

In some implementations, line interface 204-*x* may collect flow data based on packets that line interface 204-*x* processes, and organize the flow data in a flow table. FIG. 3 is a block diagram of an exemplary flow table 300. As shown, flow table 300 may include flow records, one of which is shown as flow record 302. As further shown, flow record 302 may include a source address field 304, a destination address field 306, a source port field 308, a destination port field 310, a protocol field 312, a packet count/byte field 314, and a time stamp field 316.

Source and destination address fields 304 and 306 may contain source and destination addresses (e.g., IP address), respectively, that are associated with a flow. Source and destination port fields 308 and 310 may include information indicating source and destination ports (e.g., port 80 for a web server) for the flow. Protocol field 312 may indicate a communication protocol (e.g., Transport Control Protocol (TCP)) for the flow. Packet count/byte field 314 may indicate the number of packets and/or bytes that have been transferred by the flow. Time stamp field 516 may indicate the time at which the flow record was created.

Depending on the implementation flow record 302 may include other fields, such as an age field that indicates a remaining time until flow record 302 is aged out (removed) from flow table 300, an index for designating flow record 302, etc.

Returning to FIG. 2, in addition to collecting flow data in flow table 300, line interface 204-*x* may export the flow data to other devices (e.g., collector handler 112-1). In some implementations, line interface 204-*x* may collect, store, and/or export flow data that bears specific flow signatures.

Switch fabric 206 may include one or more switches for conveying packets from one of line interfaces 204 to another of line interfaces 204.

Figure 4:
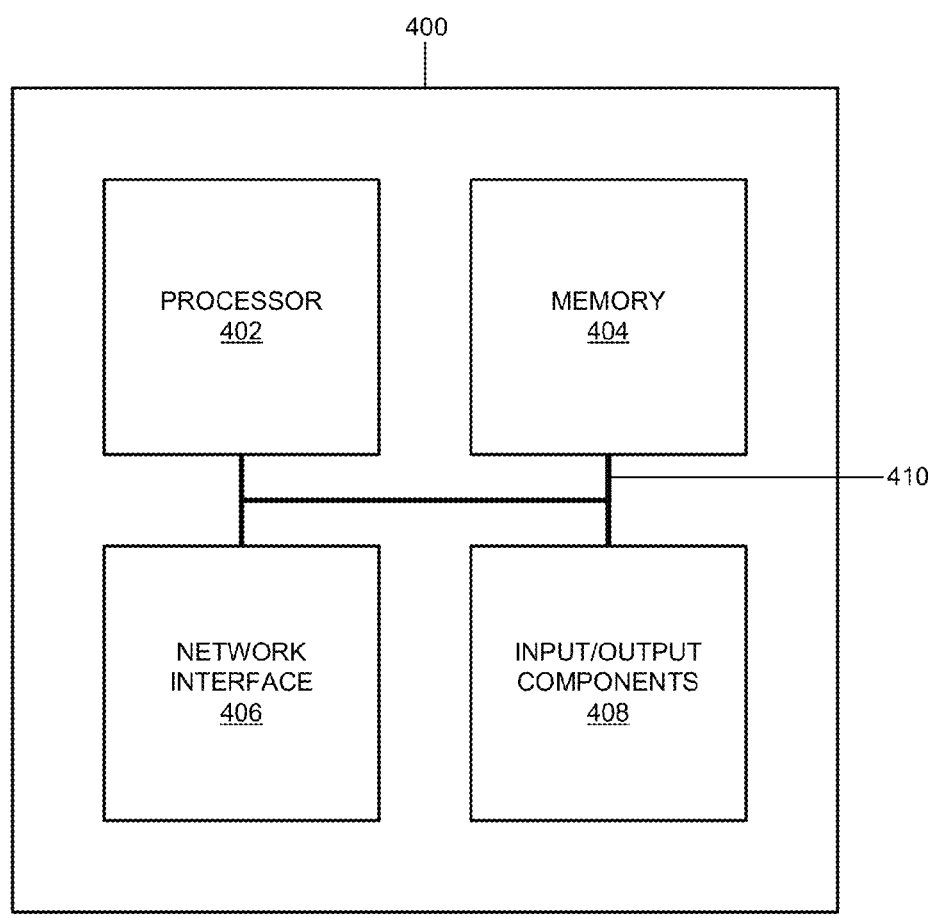
FIG. 4 is a block diagram of another exemplary device of FIG. 1.

FIG. 4 illustrates an exemplary device 400 in network 100. Device 400 may represent any one of collector handler 112-*x*, manager 114-*x*, and/or GFT manager 106. As shown, device 400 may include a processor 402, a memory 404, a network interface 406, input/output components 408, and a communication/data path 410. In different implementations, device 400 may include additional, fewer, or different components than the ones illustrated in FIG. 4.

Processor 402 may include a processor, a microprocessor, an Application Specific Integrated Circuit (ASIC), a Field Programmable Gate Array (FPGA), and/or other processing logic capable of controlling device 400.

Memory 404 may include static memory, such as read only memory (ROM), and/or dynamic memory, such as random access memory (RAM) or onboard cache, for storing data (e.g., patterns) and machine-readable instructions. Memory 404 may also include storage devices, such as a hard disk, and/or flash memory, as well as other types of storage devices.

Network interface 406 may include any transceiver-like mechanism that enables device 400 to communicate with other devices and/or systems. Input/output components 408 may include a display screen, a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to device 400. Communication/data path 410 may provide an interface through which components of device 400 can communicate with one another.

Figure 5:
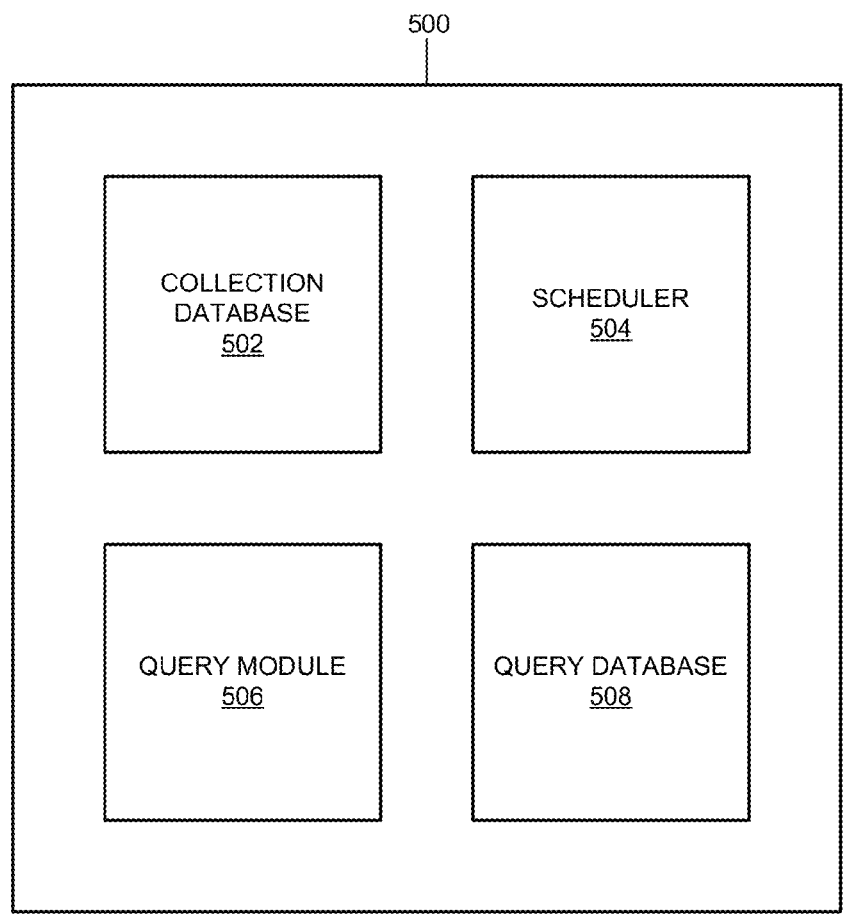
FIG. 5 is a functional block diagram of an exemplary device of FIG. 1.

FIG. 5 is a functional block diagram of an exemplary device 500 of FIG. 1. Device 500 may represent collector handler 112-*x* and/or manager 114-*x*. As shown, device 500 may include a collection database 502, a scheduler 504, a query module 506, and/or a query database 508. Depending on the implementation, device 500 may include additional, fewer, or different functional components than the ones illustrated in FIG. 5. For example, device 500 may include an operating system (e.g., Linux, Windows, etc.), an application (e.g., an email application), a web server, a browser, etc.

Collection database 502 may include flow data that is exported from one or more of collectors 108 and 110. Scheduler 504 may include a mechanism for scheduling flow match requests that are to be performed against collection database 502, issuing flow match requests to collectors 108 and/or other collector handlers 112 at scheduled times, and/or instructing collectors 108 and/or collector handlers 112 to schedule flow match requests.

Query module 506 may receive and/or send a flow match request to/from another device. When query module 506 receives a flow match request from a device, query module 506 may search collection database 502 for flow records that match a flow signature specified in the request. Alternatively, if device 500 manages other collector handlers, device 500 may pass the flow match request to such other collector handlers. When query module 506 obtains a response to the flow match request, query module 506 may pass the response to the requesting device.

Query database 508 may store flow match requests and/or flow signatures from other devices. When scheduler 504 is to perform a flow match request at a specified time, scheduler 504 may look up a specific flow match request in query database 508. In addition, scheduler 504 may push the flow match request in query database 508 to other devices (e.g., other collector handlers or collectors).

Figure 6:
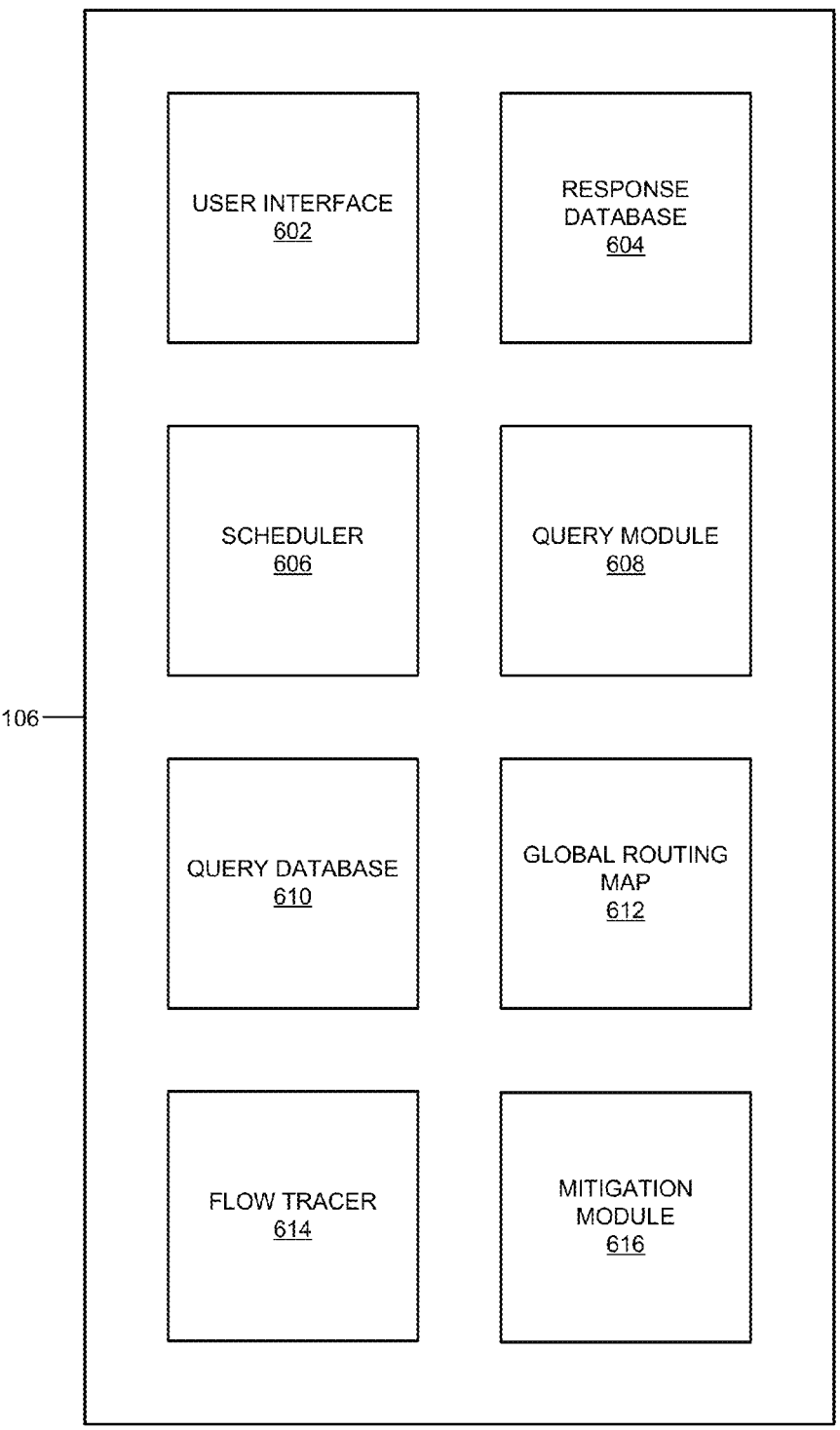
FIG. 6 is a functional block diagram of a global flow tracking (GFT) manager of FIG. 1.

FIG. 6 is a functional block diagram of GFT manager 106. As shown, GFT manager 106 may include a user interface 602, a response database 604, a scheduler 606, a query module 608, a query database 610, a global routing map 612, a flow tracer 614, and a mitigation module 616. Depending on the implementation, GFT manager 106 may include fewer, additional, or different functional components than those illustrated in FIG. 6 (e.g., a billing system that charges a user for making a flow match request, tracking request, request to divert a flow, etc.).

User interface 602 may include a hardware and/or software component (e.g., web interface/server) for interacting with a user. The user may be local (e.g., sitting at a console attached to GFT manager 106) or remote (e.g., communicating via a browser that is hosted on a remote device). Moreover, the user may be a person, a device, or another program (e.g., a script).

In interacting with the user, user interface 602 may allow a user to input a request for tracking a flow, to input a flow match request, and/or to schedule a flow match request at specific times at a specific collector 108-*x*/110-*x*. In addition, when GFT manager 106 receives a response to a flow match request from another device, user interface 602 may convey the response to the user. In some instances, user interface 602 may show a diagram of the autonomous system(s) through which the flow is passing. User interface 602 may limit who or what may issue tracking requests and/or mitigation requests (e.g., requests for security measures).

Response database 604 may include flow records or other data that are obtained from managers 114 in response to flow match requests from GFT manager 106.

Scheduler 606, query module 608, and query database 610 may include similar components as and operate similarly as scheduler 504, query module 506, and query database 508, respectively. However, scheduler 606, query module 608, and query database 610 may obtain queries and/or schedules from user interface 602 and/or flow tracer 614. Furthermore, scheduler 606 and query module 608 may interact with managers 114 in scheduling collection times for flow data and/or flow match requests.

Global routing map 612 may include interconnectivity information between collectors of different networks 102. Given an identity of a collector, GFT manager 106 may look up, in global routing map 612, identities of other collectors that may send/receive packets to/from the collector.

Flow tracer 614 may include one or more hardware and/or software components for tracking a flow. When a user detects packets that are suspect, the user may input a request to track a flow to which the packets belong. Given the request, flow tracer 614 may track the flow to a set of nodes from which packets of the flow originate.

Mitigation module 616 may include hardware and/or software components for responding to a request to mitigate effects of a flow. In one implementation, this may be accomplished via processes outlined in Request for Comments (RFC) 3882 or in accordance with flowspec, which may be used to specify a quality-of-service (QoS) in Resource reservation protocol (RSVP).

Exemplary Process for Flow Tracking

Figure 7:
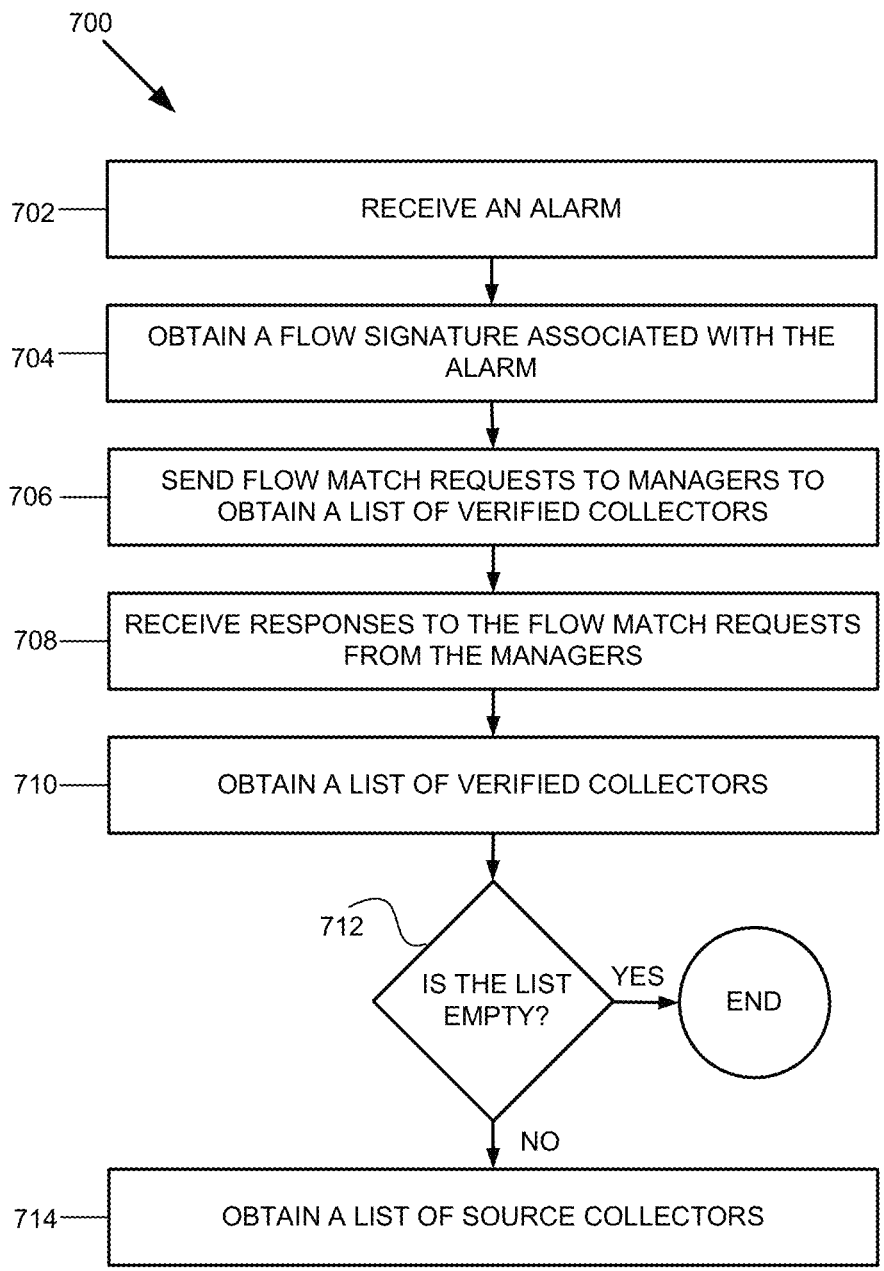
FIG. 7 is a flow diagram of an exemplary process for tracking a flow.

FIG. 7 is a flow diagram or an exemplary process 700 for tracking a flow. Assume that a device (e.g., device 104-1) receives packets via collector 108-1, and that the packets cause collector 108-1 to generate an alarm. Collector 108-1 may generate an alarm when collector 108-1 detects an anomalous flow (e.g., a flow that may be a DoS attack, carries a fake email message, or a spam email message). Process 700 may begin with a reception of the alarm (block 702). For example, GFT manager 106 may receive an alarm from collector 108-1. Alternatively, a device (e.g., a user workstation, a network management station, etc.) may receive the alarm from collector 108-1 and notify a user.

A flow signature of packets that triggered the alarm may be obtained (block 704). In one implementation, when the alarm is generated, the alarm may include a flow signature of the packets that triggered the alarm. In such an implementation, GFT manager 106 may obtain the flow signature from the alarm itself. In another implementation, GFT manager 106 may request a flow signature from the device that generated the alarm (e.g., collector 108-1). In still another implementation, GFT manager 106 may obtain the flow signature from a user via user interface 602.

Flow match requests may be sent to managers 114 to obtain a new list of verified collectors (block 706). As used herein, the term "verified collector" may refer to a collector which includes a flow record that bears a particular flow signature.

For example, GFT manager 106 may send a flow match request to all managers 114 that are cooperating with GFT manager 106 to help GFT manager 106 locate a flow. When manager 114-x receives the flow match request, manager 114-x may relay the flow match request to collector handlers 112 that manager 114-x manages. Each collector handler 112-x may search flow records in database 502, and may locate flow records that have been exported from collectors 108/110 (e.g., collectors that collector hander 112-x manages) and bears the flow signature. Collector handler 112-x may send a response that indicates particular collectors have flow records that bear the flow signature. Manager 114-x may relay the response to GFT manager 106.

Responses to the flow match requests may be received from managers 114 (block 708). For example, GFT manager 106 may receive, from manager 114-x, the response to the flow match request. The response may identify one or more verified collectors.

A list of verified collectors may be obtained (block 710). For example, GFT manager 106 may create a list of verified collectors based on responses from managers 114.

If the list of verified collectors is empty (block 712—YES), process 700 may terminate. Otherwise (block 712—NO), a list of source collectors may be obtained (block 714). As used herein, the term "a source collector" may refer to a verified collector through which the packets that triggered the alarm may have passed before passing through other verified collectors. For example, if GFT manager 106 determines that collectors 110-1 and 108-2 are verified collectors, and the packets passed through collector 108-2 and collector 110-1 to arrive at collector 108-1, then GFT manager 106 may determine collector 108-2 is a source collector.

Figure 8:
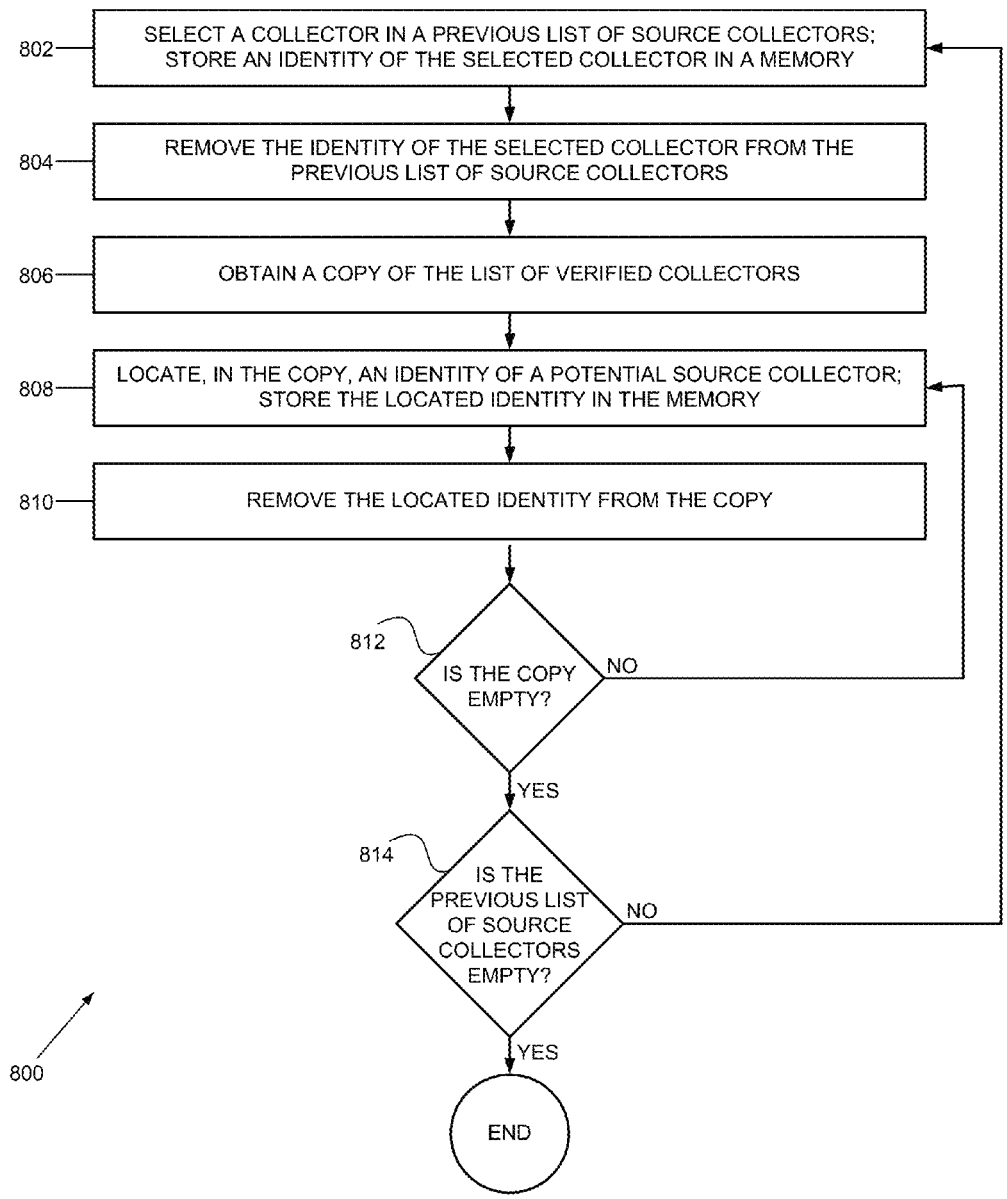
FIG. 8 is a flow diagram of an exemplary process for identifying source collectors based on a list of verified collectors.

FIG. 8 is a flow diagram of an exemplary process 800 for obtaining a list of source collectors. Process 800 start by selecting a collector in a previous list of source collectors (block 802). As used herein, generally, the term "previous list of source collectors" may refer to a list of source collectors found prior to process 800. In the context of block 714, however, "previous list of source collectors" may refer to a list containing an identity of a collector that generated the alarm.

To illustrate, assume that the identity of collector 108-1 is "204.99.23.14" and a previous list of source collectors is {204.99.23.14}. In such an instance, GFT manager 106 may select collector 108-1 in the previous list.

An identity of the selected collector may be stored in a memory (block 802). Continuing with the previous example, GFT manager 106 may store the identity 204.99.24.14 of collector 108-1 in a memory (e.g., memory 404).

The identity of the selected collector may be removed from the previous list of source collectors (block 804). Continuing with the preceding example, GFT manager 106 may remove "204.99.23.14" from the previous list of source collectors {204.99.23.14}, to obtain an empty list { }.

A copy of the list of verified collectors may be obtained (block 806). Continuing with the earlier example, assume that a list of verified collectors includes identities of collectors 110-1, 108-2, and 110-2, and the list is {204.98.41.202, 203.47.2.3, 203.48.23.201}. GFT manager 106 may create a copy of the list in a memory. The copy may include the same identities as the original list of verified collectors.

An identity of a potential source collector may be located in the copy (block 808). Continuing with the preceding example, GFT manager 106 may locate a potential source collector in the copy of the list of verified collectors. To locate the potential source, GFT manager 106 may choose a collector identity in the copy (e.g., 204.98.41.202 in {204.98.41.202, 203.47.2.3, 203.48.23.201}), and look up the chosen collector identity in global routing map 612. If a path exists from the collector with the chosen identity (e.g., 204.98.41.202) to the collector identified in the memory (e.g., 204.99.23.14), GFT manager 106 may conclude that the collector with the chosen identity is a potential source collector. Furthermore, GFT manager 106 may store the path.

If the path does not exist and the chosen collector is not a potential source collector, each of the other collector identities in the list of verified collectors may be examined in turn in the manner just described for determining whether each collector is a potential source collector.

For example, if a path does not exist from the collector 110-1 (e.g., collector with identity 204.98.41.202) to the collector identified in the memory (e.g., collector 108-1), GFT manager 106 may choose another identity in the copy {e.g., 203.47.2.3 in {204.98.41.202, 203.47.2.3, 203.48.23.201}). GFT manager 106 may look up the other chosen identity in global routing map 612 to determine whether the collector with the other chosen identity is a potential source collector. GFT manager 106 may proceed to repeat the preceding for each collector identity in the copy until GFT manager 106 locates the identity of a potential source collector.

The located identity may be stored in the memory (block 808). When the located identity is stored in the memory, the previously stored identity of a collector (see block 802) may be overwritten with the located identity.

The located identity may be removed from the copy (block 810). For example, assume that GFT manager 106 locates 204.98.41.202 in copy {204.98.41.202, 203.47.2.3, 203.48.23.201} as an identity of a potential source collector.

GFT manager 106 may remove 204.98.41.202 from copy {204.98.41.202, 203.47.2.3, 203.48.23.201} to obtain copy {203.47.2.3, 203.48.23.201}.

It may be determined if the copy is empty (block 812). If the copy is not empty (block 812—NO), process 800 may return to block 808 to locate a collector that may have sent the packets to the potential source collector located at block 808. For example, assume that an identity of the potential source collector is 204.98.41.202. Process 800 returns to block 808 to find an identity, within the copy, of a collector that sent the packets to the collector with identity 204.98.41.202. Process 800 may loop through blocks 808, 810, and 812, until the copy is empty. In addition, a potential source collector located in the last iteration of the loop may be set as a source collector in a packet forwarding path that leads to the selected collector.

Continuing with the prior example, assume that, at block 812, the potential source collector is determined as 204.98.41.202 and the copy is {203.47.2.3, 203.48.23.201}. Passing through blocks 808 and 810 may yield a potential source collector (e.g., collector 108-2) with identity 203.47.2.3 and the copy of {203.48.23.201}. Passing through blocks 808 and 810 one more time may yield a potential source collector with identity 203.48.23.201 and the copy of { } (e.g., the empty list).

In looping through blocks 808 and 810, it is possible for process 800 to establish more than one path that leads to the selected collector. In such an instance, at the end of iterations through blocks 808 and 810, process 800 may yield more than one source collector.

Returning to block 812, if the copy is empty (block 812—YES), process 800 may proceed to block 814, where it may be determined if the previous list of source collectors is empty. If the previous list of source collectors is not empty (block 814—NO), process 800 may return to block 802. Otherwise, process 800 may terminate.

Depending on the implementation, once source collectors are determined and the paths that the flow takes are identified, the source collectors and the paths may be shown on a graphical map that may also show various autonomous systems.

Alternative Implementations

Figure 9:
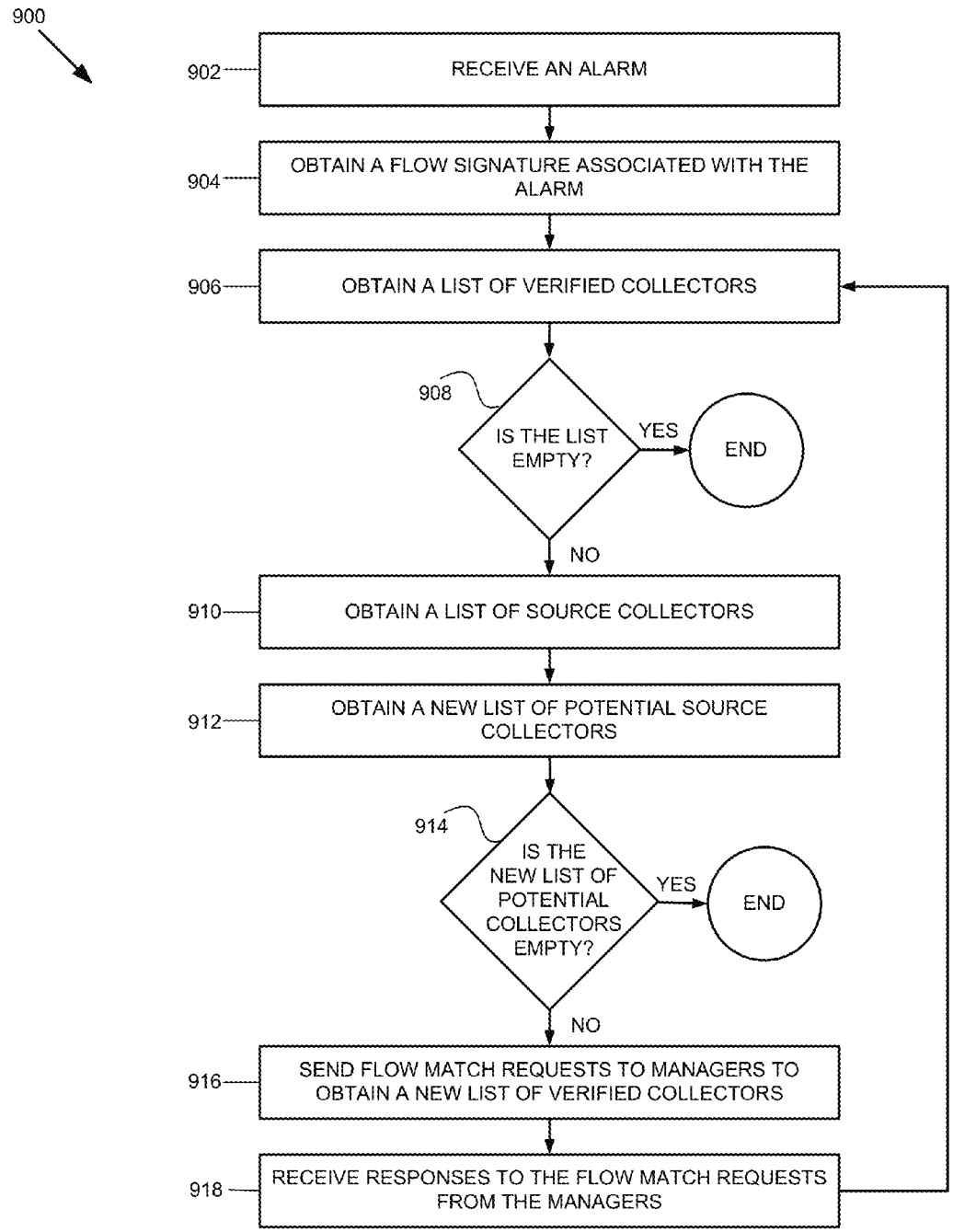
FIG. 9 is a flow diagram of another exemplary process for tracking a flow.

FIG. 9 illustrates a flow diagram of another exemplary process 900 for tracking a flow. In contrast to process 700, in process 900, source collectors may be obtained iteratively, via multiple executions of process 800 shown in FIG. 8.

Assume that a device (e.g., device 104-1) receives packets via collector 108-1, and that the packets cause collector 108-1 to generate an alarm. Process 900 may begin with a reception of the alarm (block 902). At block 904, a flow signature of packets that triggered the alarm may be obtained (block 904).

A list of verified collectors may be obtained (block 906). For example, assume that device 104-1 is under a DoS attack, collector 108-1 collects flow records that are associated with packets attacking device 104-1, and collector 108-1 generates the alarm. In such an instance, GFT manager 106 may create a list of verified collectors that includes the identity of collector 108-1.

In FIG. 9, process 900 may involve performing block 906 more than once. In such a case, process 900 may arrive at block 906 from block 918, at which messages from managers 114 may be received. The messages may provide identities of verified collectors (e.g., collectors with flow records that bear the flow signature). Based on the messages, GFT manager 106 may create a list of verified collectors.

At block 908, if the list of verified collectors is empty (block 908—YES), process 900 may terminate. Otherwise (block 908—NO), a list of source collectors may be obtained (block 910). As used herein, the term "a source collector" may refer to a verified collector through which the packets that triggered the alarm may have passed before passing through other verified collectors. For example, if GFT manager 106 determines that collectors 110-1 and 108-2 are verified collectors, and the packets passed through collector 108-2 and collector 110-1 to arrive at collector 108-1, then GFT manager 106 may determine collector 108-2 is a source collector.

In one implementation, block 910 may be accomplished by exemplary process 800, to obtain a list of source collectors. If process 800 is performed for the first time during the execution of process 900, a list containing an identity of a device (e.g., device 104-1) to which the packets are sent from the collector that generated the alarm may be used as the previous list of source collectors in process 800.

A new list of potential source collectors may be obtained (block 912). The new list of potential source collectors may be found by identifying, in global routing map 612, collectors that peer with any of the source collectors found at block 910. Continuing with the example, assume that a source collector is collector 110-2, with an identity of 203.48.23.201. GFT manager 106 may look up global routing table 612 to find a path from collector 110-1 to collector 110-2. Assuming that collector 110-1's identity is 204.98.41.202, GFT manager 106 may obtain a new list of potential source collectors, as {204.98.41.202}.

If the new list of potential source collectors is empty (block 914—YES), process 900 may terminate. Otherwise (block 914—NO), flow match requests may be sent to managers 114 that oversee the potential source collectors to obtain a new list of verified collectors (block 916).

Continuing with the preceding example, GFT manager 106 may send a flow match request to manager 114-2, which handles collector handler 112-2, which, in turn, manages collector 110-2. When manager 114-2 receives the flow match request, manager 114-2 relays the flow match request to collector handler 112-2. Collector handler 112-2 searches flow records in database 502, and locates a flow record that has been exported from collector 110-2 and bears the flow signature. Collector handler 112-2 sends a response that indicates collector 110-2 has flow records that bear the flow signature. Manager 114-2 relays the response to GFT manager 106.

Responses to the flow match requests may be received from the managers (block 918). For example, GFT manager 106 may receive, from manager 114-2, the response to the flow match request. The response may indicate that collector 110-2 is a verified collector.

At block 918, process 900 may return to block 906.

In some implementations, a flow match request may be sent in accordance with a schedule set by a user or a device. In such implementations, replies from different managers 114 may be obtained at or close to the scheduled times.

EXAMPLE

Figure 10:
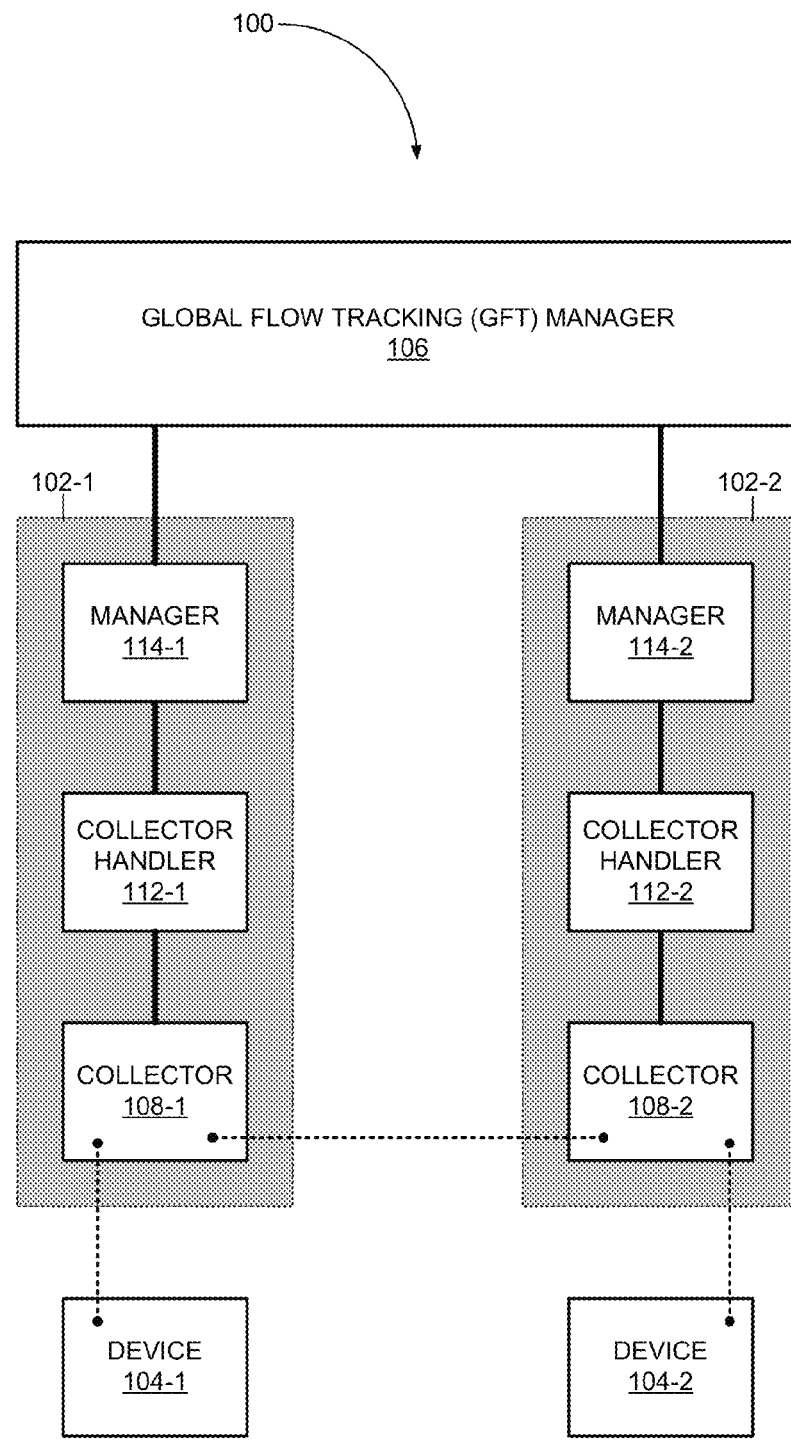
FIG. 10 is a diagram that illustrates a process for tracking a flow.

FIG. 10 illustrates an example for tracking a flow. The example is consistent with exemplary process 700 described above with reference to FIG. 7. Assume that device 104-1 is under a DoS attack from packets that are sent from device 104-2, and that the packets belong to a flow whose flow record 302 includes the following: 191.3.41.3 in source address field 304, 204.32.2.18 in destination address field 306, 80 in source port field 308, 80 in destination port field 310, and "TCP" in protocol field 312. Also assume that collector 108-1 generates an alarm.

GFT manager 106 receives the alarm, and obtains a flow signature from flow record 302. The flow signature includes the values in fields 304-312 of flow record 302, and is denoted as {191.3.41.3, 204.32.2.18, 80, 80, "TCP"}.

GFT manager 106 sends flow match requests to managers 114. Manager 114-1 relays the flow match request to collector handler 112-1. Collector handler 112-1 searches its collection database 602 based on the flow signature, locates a flow record that bears the flow signature, and sends an IP address of collector 108-1 to manager 114-1 as the identity of the collector that exported the flow record. Manager 114-1 relays the response to GFT manager 106.

Similarly, manager 114-2 relays the flow match request to collector handler 112-2. Collector handler 112-2 searches its collector database 602 based on the flow signature, locates a flow record that bears the flow signature, and sends an IP address of collector to manager 114-2 as the identity of the collector that exported the flow record. Manager 114-2 relays the response to GFT manager 106.

GFT manager 106 receives the responses from managers 114, and obtains a list of verified collectors 108-1 and 108-2. Assuming that the identity of collectors 108-1 and 108-2 are 204.32.1.1 and 194.3.2.1, the list is {204.32.1.1, 194.3.2.1}.

GFT manager 106 looks up 204.32.1.1 and 194.3.2.1 in global routing map 612, and identifies a path that begins from collector 108-2, passes through collector 108-1, and terminates at device 104-1.

Based on the path, a security administrator queries collector 108-2, and determines that the packets that generated the flow record in collector 108-2 were received from device 104-2. The security administrator disables collector 108-2 from receiving packets from device 104-2.

CONCLUSION

In the above, devices (e.g., GFT manager 106, managers 114, collector handlers 112, collectors 108, etc.) of network 100 may track a flow based on a flow signature. Because tracking is not based on source addresses of packets of the flow, the devices may track the flow even if the packets include spoofed source addresses. Once the devices track the flow to source nodes from which the packets originate, the device may inform a user (e.g., a security administrator) of the result of tracking. In response, the user may perform corrective actions, such as preventing packets from a particular device from entering network 100.

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to exemplary processes illustrated in FIGS. 7-9, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   identifying, by one or more devices, a flow signature;
   identifying, by the one or more devices, a destination collector to which packets, including the flow signature, are sent;
   identifying, by the one or more devices, a list of potential source collectors that are possible senders of the packets, including the flow signature, to the destination collector;
   sending, by the one or more devices, flow match requests to a plurality of devices associated with the list of the potential source collectors;
   receiving, by the one or more devices and from the plurality of devices, replies to the flow match requests;
   determining, by the one or more devices and based on the replies, a list of verified collectors among the potential source collectors;
   determining, by the one or more devices, that the list of verified collectors is not empty;
   identifying, by the one or more devices and based on determining that the list of verified collectors is not empty, a source collector that is identified in the list of verified collectors and that sent the packets to the destination collector; and
   outputting, by the one or more devices, information related to a path from the source collector to the destination collector.

2. The method of claim 1, where identifying the flow signature includes identifying one or more parameters that include at least one of:
   a source address associated with the packets,
   a destination address associated with the packets,
   a source port number associated with the packets,
   a destination port number associated with the packets, or
   a protocol associated with the packets.

3. The method of claim 1, where identifying the flow signature further comprises:
   identifying the flow signature from an alarm generated by an anomalous flow.

4. The method of claim 1, where identifying the list of the potential source collectors includes:
   determining, from a global routing map, that a path exits from the potential source collectors to one or more of the identified verified collectors.

5. The method of claim 4, where identifying the list of the potential source collectors further includes:
   identifying the list of the potential source collectors based on determining that the path exists from the one or more potential source collectors to the one or more of the identified verified collectors.

6. The method of claim 1, where the plurality of devices include devices that receive flow records that are exported from collectors.

7. The method of claim 1, where receiving the replies includes:
   locating flow records that have been exported by collectors and that include the flow signature.

8. A device comprising:
   a processor to:
      trace a flow to a destination collector;
      identify potential source collectors from which the flow may have been sent to the destination collector;
      send flow match requests to a plurality of devices associated with the potential source collectors;
      receive, from the plurality of devices, replies to the flow match requests;
      determine, based on the replies, a list of verified collectors among the potential source collectors;
      determine that the list of the verified collectors is not empty;
      identify a particular collector, in the list of the verified collectors, based on determining that the list of verified collectors is not empty; and
      output information related to the particular collector.

9. The device of claim 8, where the particular collector includes:
   a server;
   a gateway;
   a switch; or
   a router.

10. The device of claim 8,
    where the processor is further to:
       receive an alarm triggered by a flow before tracing the flow to the destination collector, and
    where the alarm includes:
       a flow signature of an anomalous flow.

11. The device of claim 8, where the processor is further to:
    determine a path based on a global routing map and the list of the verified collectors; and
    output information related to the path.

12. The device of claim 11, where the global routing map includes:
    a border gateway protocol (BGP) routing map.

13. The device of claim 8, where the flow includes:
    a packet that is part of a denial of service attack;
    a fake email message; or
    a spam email message.

14. The device of claim 8, further comprising:
    a component to provide a user interface that includes:
       a diagram of the particular collector, and
       an autonomous system that includes the particular collector.

15. A system comprising:
    a processor; and
    a memory to store instructions, which when executed by the processor, cause the processor to:
       identify a flow signature;
       identify a destination collector associated with the flow signature;
       identify a list of potential source collectors that possibly sent packets, including the flow signature, to the destination collector;
       send flow match requests to a plurality of devices associated with the list of the potential source collectors;
       receive, from the plurality of devices, replies;
       determine, based on the replies, a list of verified collectors among the potential source collectors;
       determine that the list of verified collectors is not empty;
       identify, based on determining that the list of verified collectors is not empty, a source collector from the list of verified collectors; and
       output information related to the source collector.

16. The system of claim 15, where the flow signature identifies at least one of:
    a source address associated with the packets,
    a destination address associated with the packets,
    a source port number associated with the packets,
    a destination port number associated with the packets, or
    a protocol associated with the packets.

17. The system of claim 15, where the flow signature is obtained from an alarm generated by an anomalous flow.

18. The system of claim 15, where, when identifying the list of potential source collectors, the processor is to:
    identify one or more of the potential source collectors; and
    determine, from a global routing map, that a path exits from the one or more of the potential source collectors.

19. The system of claim 18, where, when identifying the source collector, the processor is to:
    identify the source collector further based on the path.

20. The system of claim 15, where the plurality of devices include devices that receive flow records that are exported from collectors.

21. The system of claim 15, where, when receiving the replies, the processor is to:
    locate flow records that have been exported by collectors and that include the flow signature.

22. The device of claim 8, where the flow passed through the particular collector before passing through one or more other collectors of the verified collectors.

* * * * *